(12) United States Patent
Berger et al.

(10) Patent No.: US 10,114,520 B2
(45) Date of Patent: *Oct. 30, 2018

(54) PREVIEW CURSOR FOR IMAGE EDITING (71) Applicant: Adobe Systems Incorporated, San Jose, CA (US)

(72) Inventors: Ralf Berger, Acton, MA (US); Steve M. Troppoli, Carlisle, MA (US)

(73) Assignee: Adobe Systems Incorporated, San Jose, CA (US)

( * ) Notice: Subject to any disclaimer, the term of this patent is extended or adjusted under 35 U.S.C. 154(b) by 324 days.

This patent is subject to a terminal disclaimer.

(21) Appl. No.: 14/153,293

(22) Filed: Jan. 13, 2014

(65) Prior Publication Data

US 2014/0129992 A1 May 8, 2014

Related U.S. Application Data

(63) Continuation of application No. 11/096,805, filed on Mar. 31, 2005, now Pat. No. 8,645,870.

(51) Int. Cl.
*G06F 3/048* (2013.01)
*G06F 3/0481* (2013.01)
*G06T 11/60* (2006.01)
*G06F 3/0482* (2013.01)

(52) U.S. Cl.
CPC ........ *G06F 3/04812* (2013.01); *G06F 3/0481* (2013.01); *G06F 3/0482* (2013.01); *G06T 11/60* (2013.01)

(58) Field of Classification Search
CPC .... G06F 3/0481; G06F 3/0482; G06F 9/4446; G06F 3/04812; G06T 11/60
See application file for complete search history.

(56) References Cited

U.S. PATENT DOCUMENTS 5,162,779 A * 11/1992 Lumelsky ........... G06F 3/04812
    345/419
5,185,808 A    2/1993 Cok
5,249,263 A    9/1993 Yanker
5,467,441 A * 11/1995 Stone .................... G06T 3/0018
    345/619

(Continued)

FOREIGN PATENT DOCUMENTS

| EP | 0403125 | 12/1990 |
|----|---------|---------|
| JP | 10312187 | 11/1998 |
| WO | WO9802844 | 1/1998 |

OTHER PUBLICATIONS

2016 Memorandum regarding Subject Matter Eligibility Region, published 2016.*

(Continued)

*Primary Examiner* — Tuyetlien T Tran
(74) *Attorney, Agent, or Firm* — Finch & Maloney PLLC (57) ABSTRACT

Methods and systems, including computer program products, implementing a preview cursor for image editing. One method includes displaying an image, receiving user input moving a cursor representing an editing tool to a position on the image, and in response, displaying a cursor icon representing the cursor at the position. The editing tool is operable to have an effect when applied. The cursor icon shows the effect of applying the editing tool at the position while and only while the cursor is at the position.

12 Claims, 5 Drawing Sheets

(56) References Cited

U.S. PATENT DOCUMENTS

| | | | |
|---|---|---|---|
| 5,528,290 | A | 6/1996 | Saund |
| 5,596,346 | A * | 1/1997 | Leone ................ H04N 1/40093 |
| | | | 345/173 |
| 5,649,032 | A | 7/1997 | Burt et al. |
| 5,920,657 | A | 7/1999 | Bender et al. |
| 5,963,664 | A | 10/1999 | Kumar et al. |
| 5,986,668 | A | 11/1999 | Szeliski et al. |
| 6,078,701 | A | 6/2000 | Hsu et al. |
| 6,128,108 | A | 10/2000 | Teo |
| 6,249,616 | B1 | 6/2001 | Hashimoto |
| 6,407,747 | B1 | 6/2002 | Chui et al. |
| 6,532,036 | B1 | 3/2003 | Peleg et al. |
| 6,535,650 | B1 | 3/2003 | Poulo et al. |
| 6,618,511 | B1 | 9/2003 | Mancuso et al. |
| 6,704,041 | B2 | 3/2004 | Katayama et al. |
| 6,714,689 | B1 | 3/2004 | Yano et al. |
| 6,731,285 | B2 | 5/2004 | Matchen |
| 6,778,207 | B1 | 8/2004 | Lee et al. |
| 6,788,802 | B2 | 9/2004 | Chiba et al. |
| 7,151,546 | B1 | 12/2006 | Louveaux |
| 7,256,911 | B2 | 8/2007 | Takabayashi et al. |
| 7,327,374 | B2 | 2/2008 | Oh et al. |
| 7,336,851 | B1 * | 2/2008 | Cote ........................ G06T 11/60 |
| | | | 382/282 |
| 7,425,958 | B2 | 9/2008 | Berger et al. |
| 7,593,022 | B2 | 9/2009 | Oh et al. |
| 2002/0118221 | A1 | 8/2002 | Hudson et al. |
| 2002/0140740 | A1 * | 10/2002 | Chen ...................... G06F 3/0481 |
| | | | 715/810 |
| 2002/0149612 | A1 | 10/2002 | Malamud et al. |
| 2003/0103234 | A1 * | 6/2003 | Takabayashi ...... H04N 1/00132 |
| | | | 358/1.15 |
| 2003/0103670 | A1 | 6/2003 | Schoelkopf et al. |
| 2003/0128242 | A1 * | 7/2003 | Gordon .............. G06F 3/04815 |
| | | | 715/848 |
| 2003/0146915 | A1 * | 8/2003 | Brook ..................... G11B 27/11 |
| | | | 345/473 |
| 2003/0231240 | A1 | 12/2003 | Wilkins et al. |
| 2004/0095357 | A1 | 5/2004 | Oh |
| 2004/0205633 | A1 | 10/2004 | Martinez et al. |
| 2004/0217975 | A1 | 11/2004 | Oh |
| 2006/0087519 | A1 | 4/2006 | Berger |
| 2007/0198942 | A1 | 8/2007 | Morris |

OTHER PUBLICATIONS

Fireworks, "Fireworks MX 2004: Cloning to a Selected Area", published on Apr. 5, 2004.*

Burt, et al., "A Multresolution Spline With Application to Image Mosaics," ACM Transactions on Graphics, vol. 2, No. 4, Oct. 1983, pp. 217-236.

Chiba, et al., "Feature-Based Image Mosaicing," IAPR Workshop on Machine Vision Applications, Nov. 17-19, 1998, pp. 5-10.

Davis, "Mosaics of Scenes with Moving Objects," Proceedings of CVPR '98, Jun. 1998, 7 pages.

Girod, Bernd et al., "Direct Estimation of Displacement Histograms," OSA Meeting on Image Understanding and Machine Vision, Cape Cod, MA, Jun. 1989, pp. 73-76.

Gumustekin, "An Introduction to Image Mosaicing," Jul. 1999, 13 pgs.

Peleg, "Elimination of Seams from Photomosaics," Computer Graphics and Image Processing, 16, Jun. 5, 1980, pp. 91-94.

Szeliski, et al., "Creating Full View Panoramic Image Mosaics and Environment Maps," Proceedings of the 24th annual conference on Computer graphics and interactive techniques, 1997, 8 pages.

Xiong, et al., "Registration, Calibration and Blending in Creating High Quality Panoramas," Applications of Computer Vision, Proceedings of the Fourth IEEE Workshop, Los Alamitos, CA Oct. 19-21, 1998, pp. 69-74.

Adobe Systems Inc., Adobe Photoshop 7.0 Classroom in a Book, Adobe Press, pp. 223-224, 376, 378-379.

Sandee Cohen, Macromedia Freehand 10 for Windows and Macintosh: Visual QuickStart Guide, published Jul. 1, 2001 by PeachPit Press, Chapter 11.

Microsoft Corporation, Microsoft Windows XP Screen Captures, released Oct. 25, 2001.

The GIMP Developer Discussion Mailing List Feature Requests for Version 1.3.

* cited by examiner

PREVIEW CURSOR FOR IMAGE EDITING

REFERENCE TO PRIORITY APPLICATION

This is a continuation of U.S. patent application Ser. No. 11/096,805 (filed 31 Mar. 2005), the entire disclosure of which is hereby incorporated by reference herein.

BACKGROUND

The present invention relates to user interfaces for image editing.

In conventional image editing systems, a user can edit an image by moving a cursor to a location in the image and then applying the edit at the location pointed to by the cursor. Typically, the effect of the edit cannot be seen until after the edit has been applied. Often, the edit must be undone and then reapplied until the desired result is achieved.

SUMMARY

The invention provides methods and systems, including computer program products, implementing a preview cursor for image editing.

In one aspect, the invention provides a method that includes displaying an image, receiving user input moving a cursor representing an editing tool to a position on the image, and in response, displaying a cursor icon representing the cursor at the position. The editing tool is operable to have an effect when applied. The cursor icon shows the effect of applying the editing tool at the corresponding position while and only while the cursor is at the position.

Implementations can include one or more of the following features.

The method further includes establishing for cursor display an alternative of a preview mode or a normal mode. The cursor icon displayed in the preview mode shows the effect of applying the editing tool at the position while and only while the cursor is at the position. The cursor icon displayed while in normal mode shows a normal cursor display. The normal cursor display is a cross-hair, an arrow, a brush, a circle, or an ellipse.

The editing tool is one of a paint brush, a clone brush, a perspective brush, an erasure brush, a stamp brush, a blur brush, a sharpen brush, a smudge brush, or a liquify warp brush.

Displaying an image includes displaying a copy of the image, the copy being in a lower resolution than the image. The cursor icon shows the effect of applying the editing tool to the displayed copy, not to the image.

Applying the editing tool includes applying a simplified version of the editing tool, the simplified version being a less computationally intensive version of the editing tool.

The image is a composited rendering of a document having two or more layers. Applying the editing tool includes applying the editing tool into a new layer.

The image contains an element that has perspective. The perspective is preserved when the edit is applied to the element. The cursor displayed in preview mode shows the effect of applying the edit with the perspective preserved.

The element is a two-dimensional (2-D) representation of a three-dimensional (3-D) object.

The cursor icon is displayed only while the cursor is stationary.

In another aspect, the invention provides a system that includes an editing tool for editing an image and a preview cursor representing the editing tool. The preview cursor is operable to show the effect of applying the editing tool at a position in the image while and only while the preview cursor is at the position.

Implementations can include one or more of the following features.

The editing tool is one of a paint brush, a clone brush, a perspective brush, an erasure brush, a stamp brush, a blur brush, a sharpen brush, a smudge brush, or a liquify warp brush.

The preview cursor shows the effect of applying the editing tool to a displayed copy of the image, the displayed copy being in a lower resolution than the image.

Applying the editing tool includes applying a simplified version of the editing tool, the simplified version being a less computationally intensive version of the editing tool.

The image is a composited rendering of a document having two or more layers. Applying the editing tool includes applying the editing tool into a new layer.

The invention can be implemented to realize one or more of the following advantages.

The preview cursor allows a user to see how an edit will look before the user applies the editing tool to the image. This is particularly helpful when applying an editing tool whose effect varies depending on location. Blending, cloning, and perspective editing are examples of such an edit.

This is also particularly helpful when applying an edit that must be positioned very precisely. Cloning and erasing are examples of such an edit. The preview cursor reduces the amount of guesswork that is involved in positioning the cursor.

The preview cursor can show aspects of the editing tool that cannot be shown by conventional cursors. For example, the preview cursor can show the edge softness and opacity value of the brush.

The preview cursor can be used with a variety of different editing tools including, but not limited to, paint brushes, perspective brushes, erasure brushes, clone brushes, stamp brushes, blur brushes, sharpen brushes, smudge brushes, and liquify warp brushes.

The details of one or more implementations of the invention are set forth in the accompanying drawings and the description below. Other features, aspects, and advantages of the invention will become apparent from the description, the drawings, and the claims.

DESCRIPTION OF DRAWINGS

Like reference symbols in the various drawings indicate like elements.

DETAILED DESCRIPTION

Figure 1:
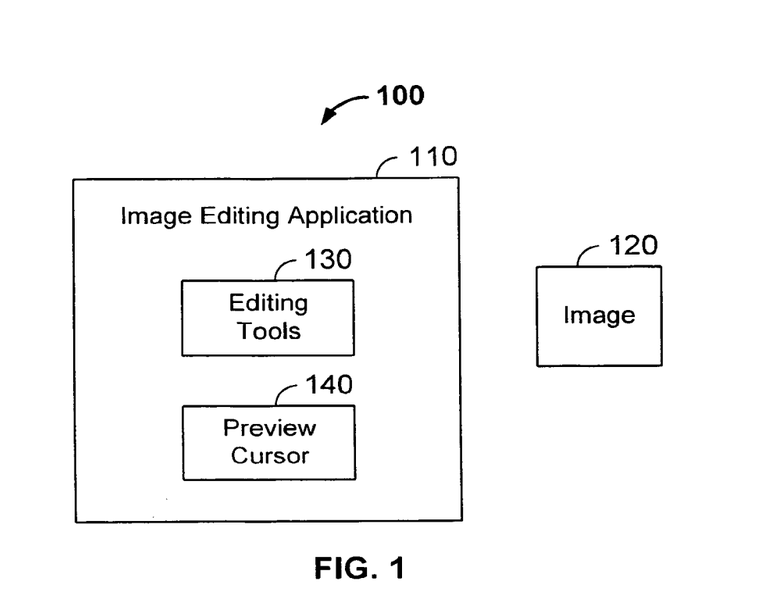
FIG. 1 illustrates a system in accordance with one implementation of the invention.

As illustrated in FIG. 1, a system in accordance with one implementation of the invention includes a computer program that is an image editing application 110. Adobe Photoshop® available from Adobe Systems Incorporated of San Jose, Calif. is an example of an image editing application.

The image editing application 110 is operable to display an image 120 for viewing and editing by a user of the application. The image 120 can be any digital image, for example, a photograph, a frame of a video or an animation, or a web page.

The image editing application 110 provides to the user one or more editing tools 130 for editing the image. Examples of editing tools are paint brushes, perspective brushes, erasure brushes, clone brushes, stamp brushes, blur brushes, sharpen brushes, smudge brushes, and liquify warp brushes.

To edit the image 120, a user selects an editing tool and then selects a position in the image where the tool is to be applied. The user selects the position by moving a cursor representing the editing tool to a position over the image. The cursor is an icon that floats above the image. The movement of the cursor can be controlled using an input device, for example, a mouse or a keyboard.

Whenever the cursor is positioned over the image, the cursor icon shows the effect of applying the selected editing tool at the current position. For example, if the tool is a paint brush, the pixels that form the cursor icon are changed to show the effect of applying the paint brush at the current position. Such a cursor will be referred to as a preview cursor 140.

The preview cursor 140 allows the user to see how the edit will look before the editing tool is actually applied to the image 120. Once the user is satisfied with the preview, the user can then instruct the image editing application 110 to apply the editing tool to the image 120. The instruction can be made by pressing down on a mouse button or entering a particular keystroke on a keyboard, for example. In response to the instruction, the image editing application 110 applies the editing tool at the current position. Optionally, the cursor icon that represents the preview cursor can have a mark (e.g., a cross or a dot) at the center to show the user where cursor is currently positioned.

In one implementation, the image editing application 110 displays a copy of the image 120. In such an implementation, the preview cursor 140 shows the effect of applying the editing tool to the displayed copy. In other words, the pixels that are displayed are changed, but the pixels of the image 120 are not changed. The copy can be in a lower resolution than the original, and therefore, changing the copy can be computationally less intensive than changing the original.

Additionally, the effect that is shown by the preview cursor 140 can be the effect of applying a simplified version of the editing tool. For example, where the editing tool is implemented as a filter, the preview cursor 140 can show the effect of applying a less computationally intensive version of the filter. The application of the full, more computationally intensive version of the filter can be delayed until the image is being edited.

In one implementation, the image 120 is a composited rendering of a document having two or more layers. Such an image is described in U.S. patent application Ser. No. 09/470,260, entitled "Hierarchical 2-D Color Compositing with Blending Mode and Opacity Controls at All Levels", the contents of which are incorporated here by reference. In such an implementation, the preview cursor 140 can show the effect of applying the editing tool in a new layer of the image. When the cursor position changes, this new layer can be discarded or cleared.

In some cases, the image 120 contains elements that are two-dimensional (2-D) representations of three-dimensional (3-D) objects. These elements can have a perspective that is based on their distance from the camera. When an edit is applied to such an image, the edit accounts for and preserves the perspective. Perspective editing tools are described, for example, in U.S. patent application Ser. No. 10/974,547, entitled "Perspective Editing Tools for 2-D Images", the contents of which are incorporated here by reference.

Figure 6:
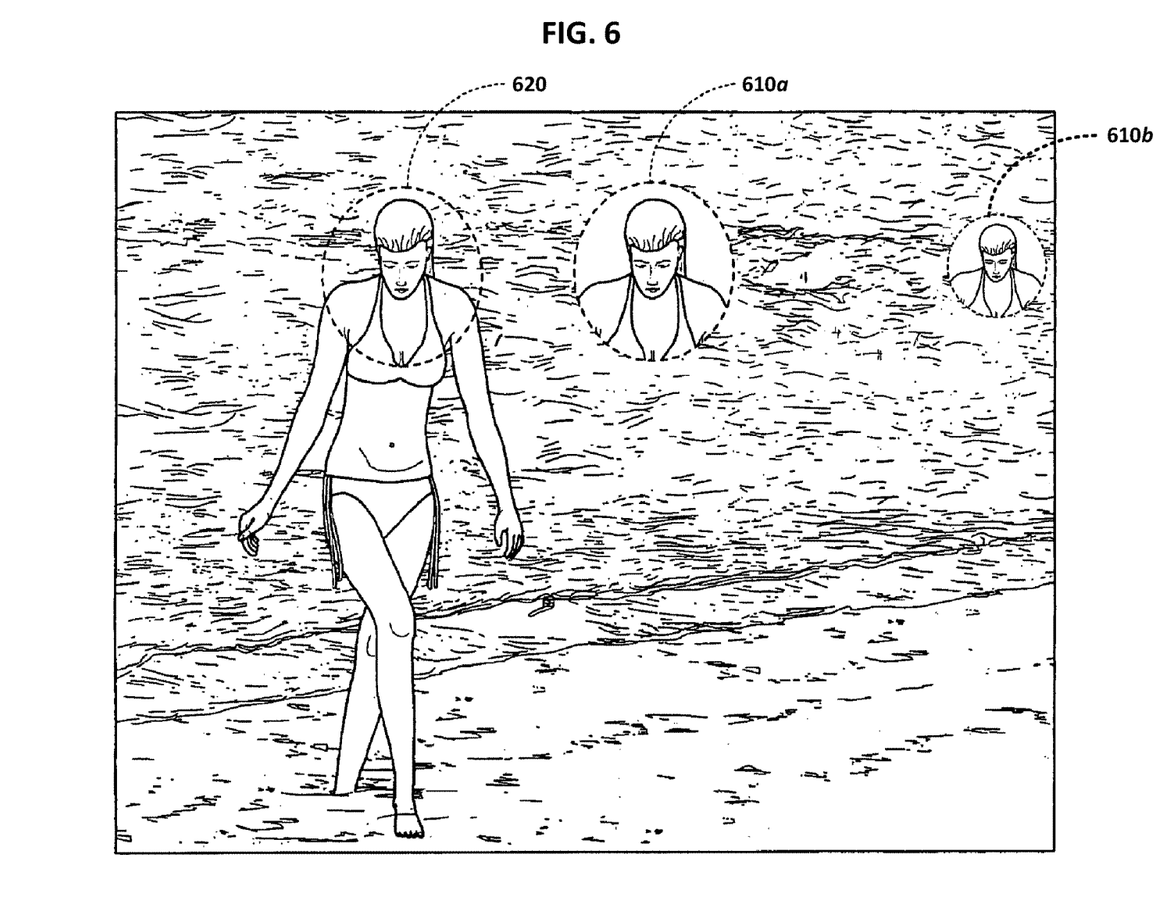
FIG. 6 illustrates a preview cursor for a clone operation that accounts for perspective.

As illustrated in FIG. 6, where the selected editing tool is a perspective editing tool, the way the preview cursor is displayed accounts for the perspective. For example, where the edit is a perspective cloning operation that is applied to a source position 620, if the current location where the clone will be placed is very close to the vanishing point of the image (such as preview cursor 610*b* illustrated in FIG. 6), then the clone that is applied will not be the same size as the source object, but will instead be reduced in size relative to the source. In this example, the preview cursor 610*b* for the relatively distant clone operation will appear in the small size that is appropriate for the position relative to the perspective. Likewise, a preview cursor 610*a* for a relatively nearby clone operation will appear in a similar size to the source position 620. This allows the user to see the effect of the perspective on the clone operation before applying the clone operation.

Figure 2:
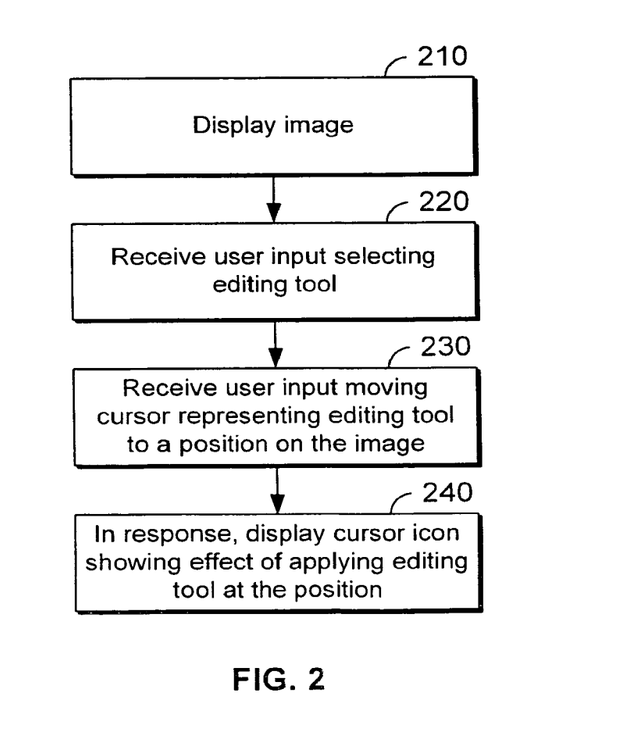
FIGS. 2 and 3 illustrate a method in accordance with one implementation of the invention.

As illustrated in FIG. 2, during system operation, the image editing application displays an image to be edited (step 210).

The user selects an editing tool to be used on the image (step 220). The selection can be performed by user input selecting an editing tool, for example, from a menu or palette of editing tools.

The image editing application receives user input moving a cursor representing the editing tool to a position on the image (step 230) and in response to the received user input, displays a cursor icon representing the cursor at the position (step 240).

Figure 3:
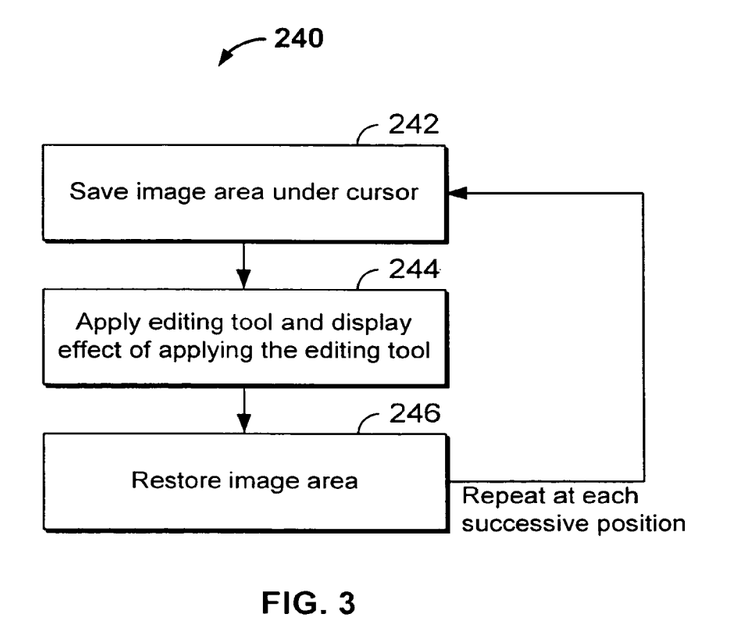

As illustrated in FIG. 3, the action of displaying the cursor icon representing the cursor at the position (step 240) can involve first saving the pixels in the image area under the cursor icon (step 242) and then applying the editing tool and displaying the effect of applying the editing tool (step 244). When the cursor is moved to a new position, the image area under the cursor icon is restored with the saved pixels (step 246), the previous actions (steps 242, 244) are repeated at the new position.

Figure 4:
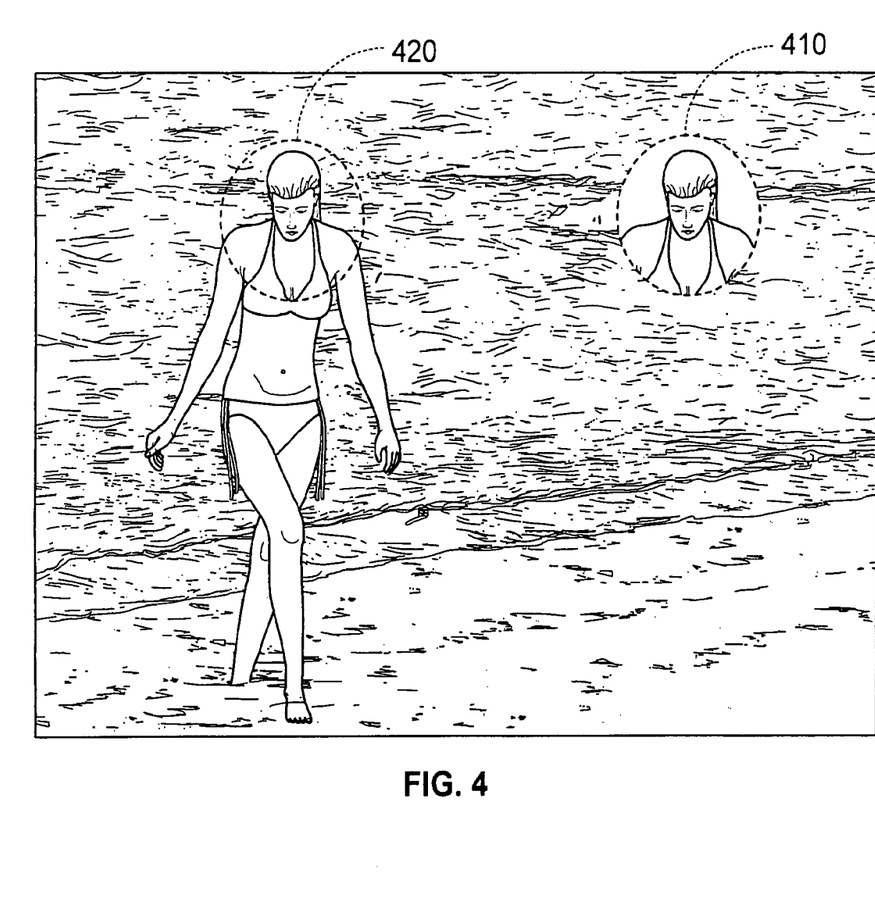
FIGS. 4 and 5 illustrate a preview cursor for a clone brush.
Figure 5:
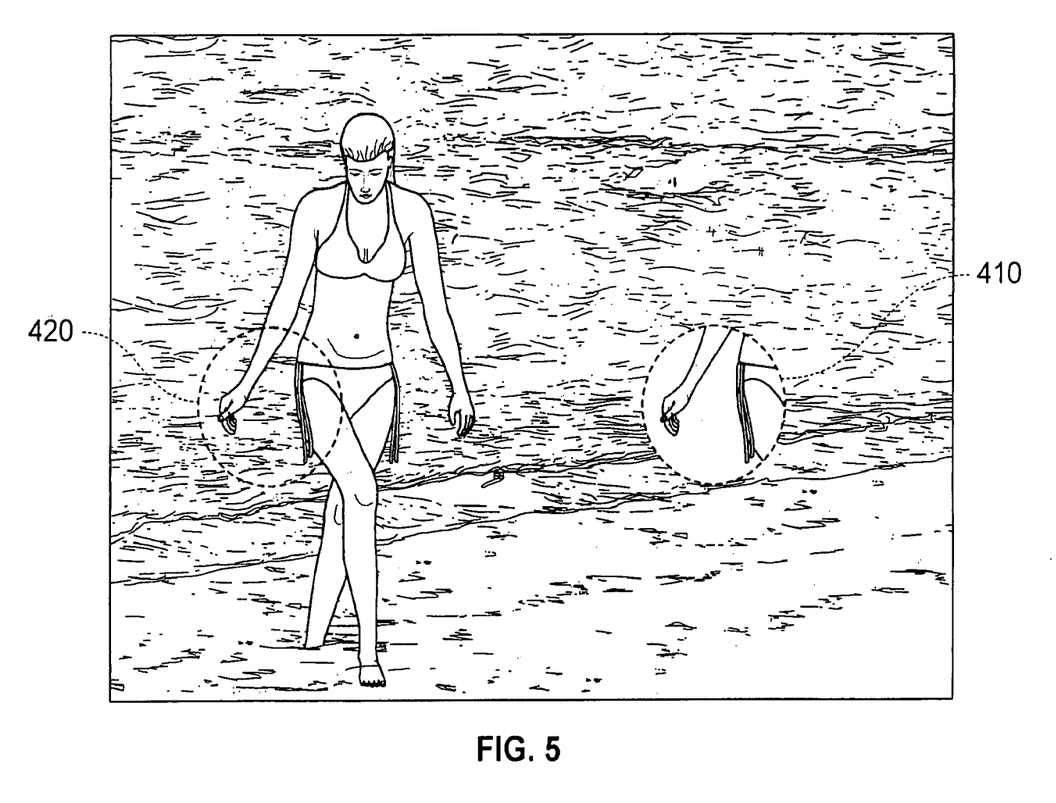

As illustrated in FIG. 4, a preview cursor 410 for a clone brush shows the effect of applying the clone brush at first position to clone a source position 420. As illustrated in FIG. 5, when the preview cursor 410 for the clone brush is moved to a new position, the appearance of the preview cursor 410 changes accordingly.

Optionally, the image editing application can operate in two modes as to editing tool cursors, a normal mode and a preview mode. When in normal mode, the cursor icon displayed shows a normal cursor display, which can be a cross-hair, an arrow, a brush, a circle, an ellipse or some other appearance. The appearance of the normal cursor display can be selectable by a user. When in preview mode, the cursor icon shows the effect of applying the editing tool at the current position. In other words, the cursor functions as a preview cursor only when the preview mode is activated. The image editing application can activate the preview mode in response to user input activating the preview mode. In one implementation, the cursor icon is displayed only while the cursor is stationary, or moving at a speed slower than a threshold value.

Implementations of the invention and all of the functional operations described in this specification can be implemented in digital electronic circuitry, or in computer software, firmware, or hardware, including the structural means disclosed in this specification and structural equivalents thereof, or in combinations of them. Implementations of the invention can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple processors or computers. A computer program (also known as a program, software, software application, or code) can be written in any form of programming language, including compiled or interpreted languages, and it can be deployed in any form, including as a standalone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of nonvolatilei memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Particular implementations of the invention have been described. Other implementations are within the scope of the following claims. For example, the actions recited in the claims can be performed in a different order and still achieve desirable results.

What is claimed is:

1. A non-transitory computer readable medium encoded with instructions that, when executed by one or more processors cause a data processing apparatus to perform operations comprising:

displaying an image that is a two-dimensional representation of a three-dimensional scene, wherein the image has a perspective based on a perceived distance within the image, and wherein the image has a vanishing point;

receiving user input moving a cursor representing a perspective cloning operation to an insertion position on the image, the perspective cloning operation being operable to cause a graphical object to be added to the image at the insertion position, wherein the graphical object that is added to the image as a result of the perspective cloning operation has a size that depends on a distance between the insertion position and the vanishing point; and in response to the received user input, displaying a cursor icon representing the cursor at the insertion position, wherein the cursor icon shows the graphical object at the insertion position while and only while the cursor is at the insertion position and wherein the size becomes larger as the cursor moves further from the vanishing point.

2. The non-transitory computer readable medium of claim 1, wherein the operations further comprise:

saving image contents corresponding to the insertion position; and restoring the image contents to the insertion position in response to subsequent user input that moves the cursor to a different position on the image.

3. The non-transitory computer readable medium of claim 1, wherein the cursor icon includes a center mark that estimates a center point of the cursor icon.

4. The non-transitory computer readable medium of claim 1, wherein the operations further comprise:

receiving subsequent user input to apply the perspective cloning operation to the insertion position; and applying the perspective cloning operation to the insertion position in response to the subsequent user input.

5. A method comprising:

displaying an image that is a two-dimensional representation of a three-dimensional scene, wherein the image has a perspective based on a perceived distance within the image, and wherein the image has a vanishing point;

receiving user input moving a cursor representing a perspective cloning operation to an insertion position on the image, the perspective cloning operation being operable to cause a graphical object to be added to the image at the insertion position, wherein the graphical object that is added to the image as a result of the perspective cloning operation has a size that depends on a distance between the insertion position and the vanishing point; and in response to the received user input, displaying a cursor icon representing the cursor at the insertion position, wherein the cursor icon shows the graphical object at the insertion position while and only while the cursor is at the insertion position and wherein the size becomes larger as the cursor moves further from the vanishing point.

6. The method of claim 5, wherein the method further comprises:
   saving image contents corresponding to the insertion position; and
   restoring the image contents to the insertion position in response to subsequent user input that moves the cursor to a different position on the image.

7. The method of claim 5, wherein the cursor icon includes a center mark that estimates a center point of the cursor icon.

8. The method of claim 5, wherein the method further comprises:
   receiving subsequent user input to apply the perspective cloning operation to the insertion position; and
   applying the perspective cloning operation to the insertion position in response to the subsequent user input.

9. A system for displaying a cursor icon, said system comprising a processor that is adapted to:
   display an image that is a two-dimensional representation of a three-dimensional scene, wherein the image has a perspective based on a perceived distance within the image, and wherein the image has a vanishing point;
   receive user input moving a cursor representing a perspective cloning operation to an insertion position on the image, the perspective cloning operation being operable to cause a graphical object to be added to the image at the insertion position, wherein the graphical object that is added to the image as a result of the perspective cloning operation has a size that depends on a distance between the insertion position and the vanishing point; and
   in response to the received user input, display a cursor icon representing the cursor at the insertion position, wherein the cursor icon shows the graphical object at the insertion position while and only while the cursor is at the insertion position and wherein the size becomes larger as the cursor moves further from the vanishing point.

10. The system of claim 9, wherein the processor is further adapted to:
    save image contents corresponding to the insertion position; and
    restore the image contents to the insertion position in response to subsequent user input that moves the cursor to a different position on the image.

11. The system of claim 9, wherein the cursor icon includes a center mark that estimates a center point of the cursor icon.

12. The system of claim 9, wherein the processor is further adapted to:
    receive subsequent user input to apply the perspective cloning operation to the insertion position; and
    apply the perspective cloning operation to the insertion position in response to the subsequent user input.

* * * * *